United States Patent [19]

Fennell

[11] Patent Number: 4,700,432

[45] Date of Patent: Oct. 20, 1987

[54] BUNDLING TIE

[76] Inventor: Michael P. Fennell, 36 Merwin Ave., Fairfax, Calif. 94930

[21] Appl. No.: 856,535

[22] Filed: Apr. 25, 1986

[51] Int. Cl.[4] .............................................. B65D 63/00
[52] U.S. Cl. ................................. 24/16 R; 24/16 PB; 604/179; 128/DIG. 26
[58] Field of Search ............... 24/16 R, 16 PB, 30.5 P, 24/30.5 S, 30.5 L, 265 WS, 450; 248/74.3; 604/179; 128/DIG. 26

[56] References Cited

U.S. PATENT DOCUMENTS

| 2,735,432 | 2/1956 | Hudson | 128/DIG. 26 |
|---|---|---|---|
| 3,006,048 | 10/1961 | Windish | 24/16 PB |
| 3,279,008 | 10/1966 | Wallach | 24/16 |
| 3,372,438 | 3/1968 | Rinecker | 24/16 |
| 3,468,050 | 9/1969 | Pool | 24/16 PB |
| 3,601,863 | 8/1971 | Dorsey | 24/16 PB |
| 3,726,280 | 4/1973 | Lacount | 604/179 |
| 3,731,348 | 5/1973 | Luehne | 24/16 PB |
| 3,765,421 | 10/1973 | Poprik | 604/179 |
| 3,889,909 | 6/1975 | Koscik | 248/74.3 |
| 3,892,011 | 7/1975 | Kohke | 24/16 PB |
| 3,942,636 | 3/1976 | Matsuyama et al. | 206/349 |
| 3,994,048 | 11/1976 | Rosenthal . | |
| 4,088,136 | 5/1978 | Hasslinger et al. | 24/16 R |
| 4,092,765 | 6/1978 | Joyce | 24/16 PB |
| 4,096,863 | 6/1978 | Kaplan et al. | 128/349 R |
| 4,114,838 | 9/1978 | Knauf | 224/455 |
| 4,138,770 | 2/1979 | Barrette et al. | 24/16 PB |
| 4,462,141 | 7/1984 | Bogese | 24/16 PB |
| 4,569,348 | 2/1986 | Hasslinger | 128/DIG. 26 |
| 4,571,245 | 2/1986 | Hubbard et al. | 604/179 |

Primary Examiner—Victor N. Sakran
Attorney, Agent, or Firm—Townsend and Townsend

[57] ABSTRACT

Novel bundling devices and methods for their use are provided. These devices are useful for bundling elongate members such as electric wires, cables, tubes, etc., or for securing such members in a coiled form.

These novel devices are characterized by being securely, semipermanently attached to a portion of an elongate member at one end of a flexible strap member. The flexible strap member includes means for the peel resistant attachment of a first portion of the strap member to a second portion of the strap member. The means of attachment will generally be in the form of VELCRO ® or other hook and loop type tape.

4 Claims, 4 Drawing Figures

U.S. Patent    Oct. 20, 1987    4,700,432
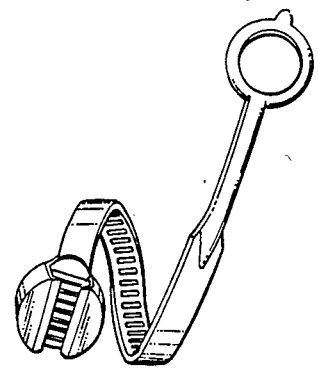
FIG._1. (PRIOR ART)
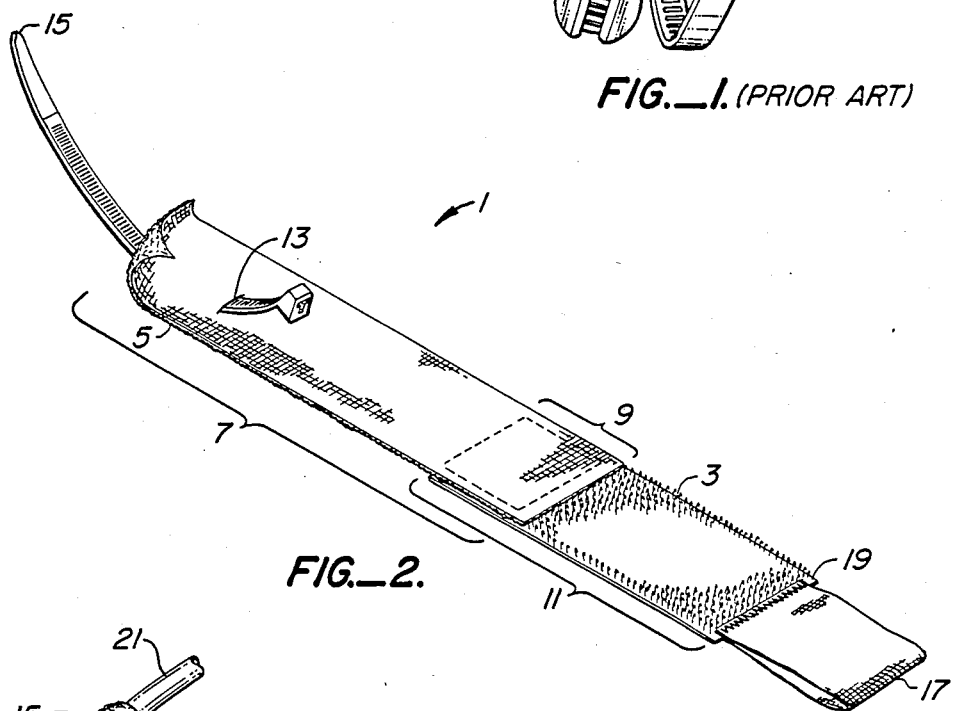
FIG._2.
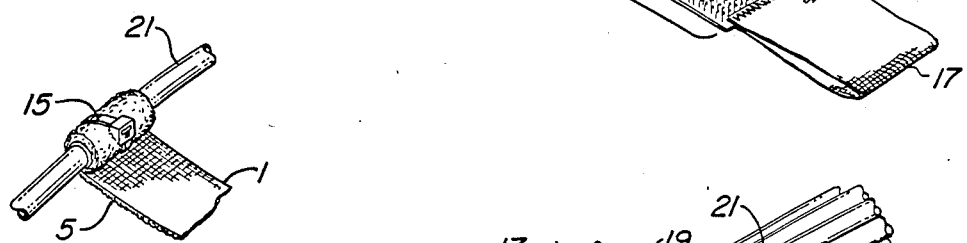
FIG._3.
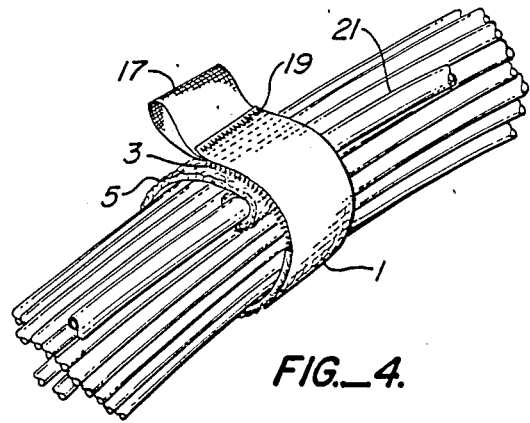
FIG._4.

BUNDLING TIE

BACKGROUND OF THE INVENTION

1. Field of the Invention

The present invention relates generally to bundling devices and, more particularly to a bundling device for bundling elongate members such as electric wires, cables, tubes, etc.

2. Description of the Relevant Literature

Fastening and bundling devices are well known in the present art and in unrelated arts.

Examples from the present art are represented by U.S. Pat. Nos. 4,138,770 (Feb. 13, 1979); 4,092,765 (June 6, 1978); and 3,892,011 (July 1, 1975). These prior art devices can all be classified as ratchet teeth devices and are characterized by having a relatively rigid head and an integrally attached strap having a series of ratchet teeth on its inner surface which engage a series of complementary ratchet teeth on a pawl member positioned within a transverse slot through the head. Once the complementary ratchet teeth are engaged, they cannot be disengaged without severing, and thereby destroying, the device.

When these prior art devices are used to secure elongate members, such as a cable, in a bundle with other elongate members, such as in a coil, they must be destroyed in order to unbundle the elongate members. This is not a problem where the elongate members are intended to remain bundled. Where, however, the elongate members are bundled and unbundled in the course of use, a new bundling tie must be used each time.

The prior art has addressed this problem of reusability, an example of which is the device illustrated in FIG. 1. Other examples include devices similar to the non-reusable ties but having an adaptation enabling one to disengage the ratchet teeth with a special tool. Although such prior art devices are reusable, they share a problem associated with the ratchet teeth devices in that once they are disengaged they are also removed from the elongate member. This requires that the device be located, if it has not been lost, in order to secure the bundled elongate members.

The prior art has addressed this problem by providing a "loop" in one end of a peel-resistant tape assembly tie for attaching the tie to a cord or cable. (This tape is commonly referred to by the trademark VELCRO ®, and is described in U.S. Pat. No. 3,372,438 (Mar. 12, 1968).) These loops are of a fixed diameter however and often require removal of larger diameter devices, such as electric plugs, before the tie may be attached to the elongate member. Also, this device randomly slides along the member and must be found with each use. There is therefore a need for a reusable bundling device which is securely, semipermanently attached to an elongate member when it is in the unbundled state, thus eliminating the need to "find" a bundling device with each intended use.

Other examples of reusable bundling devices are found in unrelated arts. Such devices generally employ VELCRO ®. Examples of such devices are found in U.S. Pat. Nos. 4,114,838 (Sept. 19, 1978); 4,096,863 (June 27, 1978); 4,088,136 (May 9, 1978); 3,994,048 (Nov. 30, 1976); 3,942,636 (Mar. 9, 1976); 3,731,348 (May 8, 1973); and 3,279,008 (Oct. 18, 1966).

SUMMARY OF THE INVENTION

Novel bundling devices and methods for their use are provided. These devices are useful for bundling elongate members such as electric wires, cables, tubes, etc., or for securing such members in a coiled form.

These novel devices are characterized by being securely semipermanently attached at one end of a flexible strap member to a portion of an elongate member. The flexible strap member includes means for the peel resistant attachment of a first portion of the strap member to a second portion of the strap member. The means of attachment will generally be in the form of VELCRO ® or other hook and loop type tape.

These novel devices are employed in a method wherein the flexible strap is securely semipermanently attached to an elongate member, preferably by employing a ratchet toothed bundling tie, bundling the elongate member with other elongate members, such as in a coil, wrapping the flexible strap around the bundle and securing the bundle by engaging the attaching means on the strap.

BRIEF DESCRIPTION OF THE DRAWINGS

FIG. 1 is a perspective view of a reusable bundling tie known in the art;

FIG. 2 is a perspective view of the present invention;

FIG. 3 is a perspective view of one end portion of the present invention securely semipermanently attached to a portion of an elongate member; and FIG. 4 is a perspective view of the present invention securing a plurality of elongate members.

DETAILED DESCRIPTION OF THE SPECIFIC EMBODIMENTS

The features of the present invention are fully depicted in FIG. 2. The invention comprises a flexible strap member 1 which has attachment means disposed at either end which, in the preferred embodiment, comprise hooks 3 at one end and loops 5 at the other end. This hook and loop attachment means is sold typically under the trademark VELCRO ®. In the preferred embodiment, a length of the loop tape of VELCRO ® is permanently attached 9 to a length of the hook tape as shown in FIG. 2.

Again referring to FIG. 2, one end portion of member 1 has a transverse slot 13 adapted in size and shape to receive a tie 15. Tie 15 is a ratchet toothed bundling tie as disclosed in U.S. Pat. Nos. 4,138,770; 4,092,765; and 3,892,011. Slot 13 is located a sufficient distance from the margins of flexible strap member 1 such that the tie 15 does not tear through the member. The end opposite slot 13 is provided with a permanently attached pull tab 17 which tab remains free of attachment from the hooks 3 or loops 5 except at the site of permanent attachment 19.

FIGS. 3 and 4 illustrate the operation of the subject invention. Referring to FIG. 3, the present invention is depicted securely semipermanently attached to an elongate member 21. The flexible strap member 1 is semipermanently attached to elongate member 21 by tie 15 which is first partially inserted through slot 13. The ratchet teeth of tie 15 are engaged after the tie is partially wrapped around a portion of the elongate member. Once the teeth are engaged, the tie is closed around the elongate member, securing the flexible strap member to the elongate member. The flexible strap member is then semipermanently attached to the elongate member since tie 15 can only be removed with the aid of a tool such as a knife or wire cutter. The strap member 1 is then always easily and readily available when it is needed to secure the elongate member to at least one other elongate member as illustrated in FIG. 4.

In FIG. 4, the subject invention is shown securing a plurality of elongate members in a bundle by employing flexible strap member 1 which is securely, semipermanently attached to elongate member 21. The bundle is secured by wrapping the flexible strap member around the plurality of elongate members and engaging the detachable attaching means disposed on the strap member. The best illustration of the use of the present invention is in securing an elongate member, such as a cable, in a coiled form. When the cable is uncoiled, used and then recoiled, the invention remains securely, semipermanently attached to the cable throughout the process and is available to secure the coil following use.

Referring to FIG. 4, flexible strap member 1 is unwrapped from the bundle by grasping the tab 17 and disengaging hooks 3 from loops 5. Also, tab 17 may be employed as a means of identifying the elongate member to which it is semipermanently attached by imprinting the tab with information relevant to the user.

As can be appreciated from the foregoing description of the present invention, a novel improved bundling tie is provided which, when employed according to the described method, overcomes the problems associated with prior art devices. The secure, semipermanent attachment of a flexible strap member having attachment means to an elongate member removes the necessity for the user to search for a new tie (or the old one when reusable) whenever one is needed.

While the present invention has been described in some detail for purposes of illustration and clarity of understanding, the true scope of the invention, as readily apparent to those skilled in the art, is defined by the appended claims.

What is claimed is:

1. A detachable fastening device comprising:

a flexible strap member having first and second end portions;

means for attaching the first end portion of the strap member to the second portion of the strap member; and means for securely, semipermanently attaching the strap member to an elongated member, wherein the means for securely, semipermanently attaching the strap member to an elongate member comprises a tie longitudinally inserted through a slot in one of the end portions of the strap member such that the tie is circumferentially engageable on a portion of the elongate member and securely, semipermanently attached the strap member to the elongate member when so engaged, said tie can only be removed with the aid of a tool.

2. A detachable fastening device according to claim 1, wherein the slot is located a sufficient distance from the margins of the strap member such that the tie does not tear through the strap member.

3. A detachable fastening device according to claim 1, wherein a pull tab is permanently attached to the end portion of the strap member not having the slot.

4. A detachable fastening device according to claim 3, wherein the pull tab has means for identifying the elongate member.

* * * * *